United States Patent Office 3,482,935
Patented Dec. 9, 1969

3,482,935
DELTA TITANIUM TRICHLORIDE
Quirino A. Trementozzi, Springfield, Mass., Douglas O. Geymer, Orinda, Calif., Thomas Boyd, Des Peres, Mo., and Heinz J. Dietrich, Bethany, Conn., assignors to Monsanto Company, St. Louis, Mo., a corporation of Delaware
No Drawing. Continuation-in-part of application Ser. No. 519,421, Jan. 10, 1966, which is a division of application Ser. No. 143,300, Oct. 6, 1961, which in turn is a continuation-in-part of application Ser. No. 850,013, Nov. 2, 1959. This application July 20, 1966, Ser. No. 566,481
Int. Cl. C01g 23/02
U.S. Cl. 23—87     7 Claims

ABSTRACT OF THE DISCLOSURE

Disclosed herein is the delta form of titanium trichloride (delta $TiCl_3$) and a method for its preparation. The disclosed preparation method comprises subjecting alpha or gamma titanium trichloride to high frequency grinding of at least 1800 impacts per minute. The delta form of titanium trichloride (delta $TiCl_3$) is especially useful as an alpha-olefin polymerization catalyst.

---

This application is a continuation-in-part of our copending application Ser. No. 519,421, filed Jan. 10, 1966, now abandoned, which in turn is a division of our copending application Ser. No. 143,300, filed Oct. 6, 1961, now abandoned, which in turn was a continuation-in-part of our then copending application Ser. No. 850,013 filed Nov. 2, 1959, and now abandoned.

The invention relates to the stereospecific polymerization of alpha-olefins and more particularly relates to a process for increasing the activity of $TiCl_3$-containing catalyst systems in the stereospecific polymerization of alpha-olefins.

It is known that stereoregulated polymers can be prepared by polymerizing alpha-olefins under relatively mild conditions of temperature and pressure in the presence of a catalyst system comprising $TiCl_3$ and an organometallic reducing agent, usually an aluminum alkyl compound. It is also known that the polymerization activity of the catalyst system in the early stages of polymerization can be increased by various methods of decreasing the particle size of the catalyst, e.g., by subjecting a dispersion of $TiCl_3$ in an inert liquid diluent to the action of ultrasonic vibrations or by ball milling $TiCl_3$ for about 40–70 hours in the presence of an aluminum alkyl compound and an inert diluent.

The polymerization activity of the catalyst can be increased as much as 100% by the latter method of decreasing its particle size. However, since (1) it is to be expected that a type of catalyst modification which would permit an increase in both the initial and the steady state rates of polymerization would be more effective than a type of catalyst modification which permits an increase in only the initial rate of polymerization and (2) reducing the particle size of the catalyst permits an increase in only the initial rate of polymerization, it would obviously be desirable to modify the catalyst in some manner different from or additional to particle size reduction in order to permit an increase in catalytic activity throughout the polymerization process.

An object of the invention is to provide a novel modified $TiCl_3$.

Another object is to provide a novel process for modifying $TiCl_3$.

Another object is to provide an improved process for the stereospecific polymerization of alpha-olefins.

Another object is to provide a process for increasing the activity of $TiCl_3$-containing catalyst systems in the stereospecific polymerization of alpha-olefins.

A further object is to provide a process for increasing this polymerization activity in such manner that both the initial and the steady state rates of polymerization are increased.

These and other objects are attained by treating either or both of the alpha and gamma crystalline forms of $TiCl_3$, obtained either by hydrogen or aluminum reduction of $TiCl_4$, so as to change its crystal structure by impact grinding dry $TiCl_3$ particles at an impact frequency of at least 1800 impacts per minute. The treated $TiCl_3$, in lieu of untreated $TiCl_3$, can be used in conjunction with an organometallic reducing agent to form a catalyst system having increased activity in the stereospecific polymerization of alpha-olefins.

The following examples are given to illustrate the invention. In each of the processes described in the examples, it should be understood that precautions must be taken in choice of the apparatus, purification of the chemicals, and maintenance of an inert atmosphere to prevent contamination of the catalyst by moisture or oxygen. Parts mentioned in the examples are parts by weight. The cumulative polymerization rate constants, expressed as $K_{RC}$, are determined as follows:

$$K_{RC} = \frac{P}{C \times T \times PP}$$

where P represents the number of grams of polymer per liter, C represents the number of millimols of $TiCl_3$ per liter, T represents the polymerization time in hours, and PP represents the partial pressure of monomer in atmospheres.

EXAMPLE I (Control)

A suitable reaction vessel is charged with a dispersion of 1 part of alpha-$TiCl_3$ (commercial product having an average particle size of about 2 microns in diameter) in 658 parts of n-hexane, followed by addition of a solution of 2.2 parts of $Al(C_2H_5)_3$ in 8 parts of n-hexane. The reaction vessel is placed in a constant temperature bath maintained at 50° ±1° C., and propylene is charged to the vessel over a period of 15 hours so as to maintain a propylene partial pressure of 0.5 atmosphere. An inert atmosphere is maintained in the vessel throughout the reaction. After 15 hours the reaction is terminated by quenching with isopropanol. 10 minutes are allowed for the alcohol to react with the catalyst, and the slurry is then filtered to separate a precipitate which is reslurried with isopropanol, washed several times with methanol, and vacuum dried at 60° C. for 16 hours. Crystallizable polymer is isolated by hot heptane extraction of atactic polymer.

The reaction results in the formation of 26 parts of solid polypropylene having a viscosity average molecular weight of 417,000 and a number average molecular weight of 62,500. The crystallizable portion constitutes about 87.5% of the total polymer. The $K_{RC}$ is 0.53.

EXAMPLE II

One gram of dry particles of the alpha-$TiCl_3$ described in Example I is pretreated for 10 minutes in a dry, inert atmosphere by subjecting the particles to the high frequency impact of two steel balls having a diameter of ¼" in the cylinder (3 cc. capacity) of a "Wig-L-Bug," a vibratory grinder manufactured by the Crescent Dental Mfg. Co. and operated at 3150–3250 revolutions per minute, to produce activated particles of less than 0.5 micron in diameter. X-ray analysis shows this pretreated alpha-$TiCl_3$ to be delta-$TiCl_3$.

Example I is then repeated with the exception that 1 part of this pretreated alpha-TiCl$_3$ is substituted for the 1 part of untreated alpha-TiCl$_3$. The reaction results in the formation of 126 parts of solid polypropylene having a viscosity average molecular weight of 246,000 and a number average molecular weight of 67,000. The crystallizable portion constitutes about 84% of the total polymer. The $K_{RC}$ is 2.58.

Use of 1 part of the pretreated alpha-TiCl$_3$ as a catalyst component in polymerization processes conducted under the same conditions as those outlined above, with the exception of variations in the polymerization time, results as follows:

| Polymerization time (hours): | $K_{RC}$ |
|---|---|
| 0.5 | 9.6 |
| 1 | 7.64 |
| 2 | 6.45 |
| 3.67 | 4.79 |
| 4 | 4.55 |
| 7.5 | 2.58 |
| 15.2 | 2.41 |
| 15.5 | 2.39 |
| 15.5 | 2.24 |
| 15.5 | 2.13 |
| 15.8 | 2.1 |

EXAMPLE III

One gram of dry particles of the alpha-TiCl$_3$ described in Example I is pretreated for 20 minutes in a dry, inert atmosphere by subjecting the particles to the high frequency impact of two steel balls having a diameter of ¼″ in the cylinder (3 cc. capacity) of a "Wig-L-Bug" operated at 3150–3250 revolutions per minute. This pretreated alpha-TiCl$_3$ is delta-TiCl$_3$, as determined by X-ray analysis.

Example I is then repeted with the exception that 1 part of this pretreated alpha-TiCl$_3$ is substituted for the 1 part of untreated alpha-TiCl$_3$. The reaction results in the formation of 168 parts of solid polypropylene, of which the heptane-insolubles constitute about 83.3%. The $K_{RC}$ is 3.44.

EXAMPLE IV

Five grams of dry particles of the alpha-TiCl$_3$ described in Example I are pretreated for 10 minutes in a dry, inert atmosphere to change the crystal structure to the delta form by subjecting the particles to the high frequency impact of three steel balls having a diameter of ⅝″ in the cylinder (about 30 cc. capacity) of a "Wig-L-Bug" operated at 3450 revolutions per minute. Example I is then repeated with the following expections:

(1) 1 part of this pretreated alpha-TiCl$_3$ is substituted for the 1 part of untreated alpha-TiCl$_3$, and (2) The polymerization time is 15.5 hours.

The reaction results in the formation of 200 parts of solid polypropylene, the crystallizable portion of which constitutes about 85%. The $K_{RC}$ is 3.93.

EXAMPLE V (Control)

Example I is repeated with the following exceptions:
(1) The polymerization time is 6 hours, and
(2) For the 1 part of alpha-TiCl$_3$ is substituted 1 part of gamma-TiCl$_3$ prepared by reducing TiCl$_4$ with Al(CH$_3$)$_3$, subsequently decomposing the resultant CH$_3$TiCl$_3$ in an inert hydrocarbon diluent, and then heating the substantially pure gamma-TiCl$_3$ thus formed at 250–300° C. for 2–3 hours.

The reaction results in the formation of 50 parts of solid polypropylene, of which the heptane-insolubles constitute about 80.6%. The $K_{RC}$ is 2.54.

EXAMPLE VI

Two grams of dry particles of the gamma-TiCl$_3$ described in Example V are pretreated for 10 minutes in a dry, inert atmosphere by subjecting the particles to the high frequency impact of three steel balls having a diameter of ⅝″ in the cylinder (about 30 cc. capacity) of a "Wig-L-Bug" operated at 3450 revolutions per minute to convert the gamma-TiCl$_3$ to delta-TiCl$_3$.

Example V is then repeated with the exception that 1 part of this pretreated gamma-TiCl$_3$ is substituted for the 1 part of untreated gamma-TiCl$_3$. The reaction results in the formation of 96 parts of solid polypropylene, of which the heptane-insolubles constitute about 76.5%. The $K_{RC}$ is 4.95.

EXAMPLE VII (Control)

A suitable reaction vessel containing a dispersion of 1 part of alpha-TiCl$_3$ (a commercial product obtained by the hydrogen-reduction of TiCl$_4$) and 2.2 parts of Al(C$_2$H$_5$)$_3$ in about 149 parts of n-heptane is placed in a constant temperature bath maintained at 70° C. Propylene is charged to the vessel over a period of 2 hours so as to maintain a propylene partial pressure of 0.6 atmosphere. After 2 hours the reaction is terminated by quenching with isopropanol. Ten minutes are allowed for the alcohol to react with the catalyst, and the slurry is then filtered to separate a precipitate which is reslurried with isopropanol, washed several times with methanol, and vacuum dried at 60° C. for 16 hours. The reaction results in the formation of about 0.16 part of solid polypropylene. The $K_{RC}$ is 0.20.

EXAMPLE VIII

A dispersion in 30 ml. of heptane of 0.116 gram of the alpha-TiCl$_3$ described in Example VII is charged to a vessel having a 1″ diameter. A piezo-electric transducer is attached to the vessel and operated for two minutes at a frequency of 24,000 cycles/second and a power input of 10–15 watts/cm.$^2$. This pretreated alpha-TiCl$_3$ has a reduced particle size, as evidenced by the greater stability of the dispersion. X-ray analysis shows that the pretreated alpha-TiCl$_3$ is still the alpha-form.

Example VII is then repeated with the exception that 1 part of this pretreated alpha-TiCl$_3$ is substituted for the 1 part of untreated alpha-TiCl$_3$. The reaction results in the formation of about 0.40 part of solid polypropylene. The $K_{RC}$ is 0.52.

EXAMPLE IX

Two and one-half grams of dry particles of the alpha-TiCl$_3$ described in Example VII are pretreated for 20 minutes in a dry, inert atmosphere by subjecting the particles to the high frequency impact of three steel balls having a diameter of ⅝″ in the cylinder (about 30 cc. capacity) of a "Wig-L-Bug" operated at 3450 revolutions per minute. This pretreated alpha-TiCl$_3$ is shown to be delta-TiCl$_3$ by X-ray analysis.

Example VII is then repeated with the exception that 1 part of this pretreated alpha-TiCl$_3$ is substituted for the 1 part of untreated alpha-TiCl$_3$. The reaction results in the formation of about 10 parts of solid polypropylene. The $K_{RC}$ is 13.33.

The invention is a process for increasing the activity of TiCl$_3$, containing catalyst systems in the stereospecific polymerization of alpha-olefins by pretreating the TiCl$_3$ component of the catalyst so as to change its crystal structure. It is applicable to the treatment of TiCl$_3$ in two of its previously-known crystalline forms, i.e., alpha- or gamma-TiCl$_3$ regardless of the technique used to prepare the TiCl$_3$ being treated, such as hydrogen or aluminum reduction of TiCl$_4$. Thus, e.g., the TiCl$_3$ can be substantially pure TiCl$_3$, TiCl$_3$ containing AlCl$_3$ in solid solution, etc.

The pretreatment is a modification of TiCl$_3$ by high frequency impact grinding of dry TiCl$_3$ particles, the frequency of impact being at least 1800, preferably at least 8000, impacts per minute. The grinding medium can be any material capable of exerting a grinding force against the TiCl$_3$ particles under high frequency impact conditions, steel balls and rods being particularly suitable. Any device capable of causing a grinding force to impinge the TiCl₃ particles at high frequency can be used to accomplish this pretreatment, particularly suitable devices being the "Wig-L-Bug" mentioned in the working examples, other high speed vibratory grinders, hammer and impact mills, and the like. As will be obvious to those skilled in the art, the time required to effect the desired modification of TiCl₃ is dependent on the nature of the device used to accomplish the pretreatment, the density and configuration of the grinding medium, the frequency of impact, the crystalline form of TiCl₃ being treated, and other variables. When the variables are adjusted to give energy conditions comparable to those shown in the working examples, the pretreatment of TiCl₃ is usually continued for about 3–20 minutes.

The pretreatment results in changing the crystal structure of TiCl₃ and usually (at least when the material being treated has a particle size of greater than 1 micron in diameter) also results in reducing its particle size. Because of the change in crystal structure resulting from this pretreatment, the consequent increase in the polymerization actitvity of TiCl₃-containing catalyst systems is greater than would be proportional to the increase in surface area of TiCl₃ particles.

High frequency impact grinding of dry TiCl₃ in accordance with the present invention leads to the formation of a new crystalline form of TiCl₃: delta-TiCl₃. A discussion of the crystal structure of delta-TiCl₃ can be found in G. Natta et al., "The Different Crystalline Modifications of TiCl₃, a Catalyst Component for the Polymerization of Alpha-Olefins," Journal of Polymer Science, vol. 51, pp. 399–410 (1961). This new crystalline form of TiCl₃ is a more active catalyst component than any of the three previously known crystalline forms and is characterized in the said Natta reference as follows:

"The powder spectrum of delta-TiCl₃ shows some sharp lines together with some diffuse reflections of halos. The number of sharp lines appears to be remarkably lower than those detectable in the corresponding spectra of the alpha- and gamma-modifications. The corresponding reflections on the basis of a hexagonal unit cell having the same dimensions of those of alpha- and gamma-TiCl₃ (i.e., $a=b \cong 6.13$ A., $c \cong 17.40$ A.) possess Bragg indexes satisfying the relationships $h=3m$, $k=3n$, $l=3p$ ($m$, $n$, $p$=integer numbers).

"Reflections of this type are the only ones that appear in both the alpha- and gamma-modifications with the same indexes and intensity, suggesting that the structure of the delta-modification is in some way similar to the alpha- and gamma-structures. Clearly, the presence of halos in addition to the above-mentioned reflections indicates some type of disorder in the layer structures. Two halos are more characteristic and intense (data recorded on most of the examined samples). One has a maximum at 2 theta=17.2° (CuKα)(d=5.13 A.), halo concentrated toward the lowest 2 theta values, strong. A second halo has a maximum at 2 theta=33.8° (CuKα)(d=2.65 A.), symmetrical, very strong.

"The first halo appears with similar shape and intensity in the spectra of the alpha- and sometimes of the gamma-modification. A distribution of X-ray intensity lying in this 2 theta region must be due to diffraction by the titanium atoms alone. In alpha-TiCl₃, it has been indeed explained by Reed and MacWood as originated from 10$l$ ($l$ continuous and small) streaks, owing to disorder in the succession of titanium atoms layers. As the intensity in reciprocal space may be approximately assumed to be uniformly distributed along the (10$l$) zone ($l$ continuous) and the difference in Bragg angles (theta (10$l$)-theta (100)) tends to zero as $l^2$, for $l$ small, the shape of the halo must by disymmetric in respect to its maximum, ending very sharply toward the low (2 theta) angles, and being more and more diffuse at high angles.

"The halo at 2 theta=33.8° (d=2.65 A.) is much stronger and characteristic than the 17.2° halo, since it lies intermediate between the sharp lines at 2 theta=32.9° (d=2.72 A.) and 2 theta=35.6° (d=2.52 A.), which are typical for the alpha-modification ( reflection with (11$\bar{3}$) and (113) indexes) and for the gamma-form (reflection with (11$\bar{4}$) indexes), respectively, and it appears to substitute them in the new form."

Pretreatment of dry TiCl₃ in accordance with this invention results in increasing the activity of TiCl₃-containing catalyst systems in the stereospecific polymerization of alpha-olefins. This application of TiCl₃ is too well known to require detailed description, but it may be described briefly as the formation of stereoregulated polymers by polymerizing one or more alpha-olefins, e.g., aliphatic alpha-olefins containing 2–8 carbon atoms, such as ethylene, propylene, butene-1, etc., aryl olefins such as styrene, etc., under relatively mild conditions of temperature and pressure, e.g., at 20–200° C. under pressures not exceeding 200 p.s.i., usually at 50–90° C. under pressures of 15–100 p.s.i., in the presence of a catalyst system comprising a dispersion in an inert hydrocarbon diluent of TiCl₃ and an organo-metallic reducing agent, e.g., a zinc alkyl compound, an antimony alkyl compound, a beryllium alkyl compound, or preferably a compound corresponding to the formula AlRR'R", wherein R represents an alkyl radical, R' and R" represent an alkyl radical or halogen, and R, R' and R" may represent the same or different substituents attached to Al. The catalyst composition can include optional addends such as alcohols, amines, organic acids, chlorinated organic compounds, simple inorganic salts, organo-metallic compounds of metals of Groups II and III of the periodic table, etc.

Use in these catalyst compositions of the dry-ground TiCl₃ of the invention in lieu of TiCl₃ which has not been treated by the process of the invention is particularly advantageous in that it results in increasing both the initial polymerization rate and the steady state polymerization rate, thus increasing the polymer yield. It has additional advantage over the use of untreated TiCl₃ in that it causes a narrowing of the molecular weight distribution of the polymers formed.

It is obvious that many variations may be made in the products and processes set forth above without departing from the spirit and scope of this invention.

What is claimed is:

1. Delta-TiCl₃ which is further characterized by having a powder spectrum with a halo having a maximum at 2 theta=17.2° (CuKα)(d=5.13 A.) and another halo having a maximum at 2 theta=33.8° (CuKα)(d=2.65 A.).

2. A process for the preparation of the delta form of TiCl₃ which is further characterized by having a powder spectrum with a halo having a maximum at 2 theta=17.2° (CuKα)(d=5.13 A.) and another halo having a maximum at 2 theta=33.8° (CuKα)(d=2.65 A.); which process comprises impact grinding dry particles of a TiCl₃ selected from the group consisting of alpha-TiCl₃ and gamma-TiCl₃ in a vibratory grinder of the high frequency impact type which comprises a container having a cylindrical cross section and having therein a plurality of steel balls, wherein the TiCl₃ to be ground is placed within the container and the container is then closed and vibrated for at least three minutes at a rate so as to provide an impact frequency within the container of at least 1800 impacts per minute, wherein the grinding is carried out under an inert atmosphere free of moisture and oxygen.

3. A process as in claim 2 wherein the impact frequency is at least 8000 impacts per minute.

4. A process as in claim 2 wherein the grinding is performed in a high speed vibratory grinder operated at 3150 to 3250 revolutions per minute.

5. A process as in claim 2 wherein the grinding time is for about 3 to 20 minutes.

6. A process as in claim 2 wherein the TiCl₃ is alpha-TiCl₃.

7. A process as in claim 2 wherein the TiCl$_3$ is gamma-TiCl$_3$.

References Cited

UNITED STATES PATENTS

| | | | |
|---|---|---|---|
| 3,010,787 | 11/1961 | Tornqvist | 23—87 |
| 3,109,822 | 11/1963 | Kaufman et al. | 23—87 XR |
| 3,134,642 | 5/1964 | Mertes | 23—87 |

OTHER REFERENCES

Chem. Abstracts, vol. 52 (September-October 1958), p. 15183.

Chem. Abstracts, vol. 54 (September-October 1960), p. 16980.

La Chimica & l'Industria, November of 1960, vol. 42, No. 11, pp. 1207, 1212–1215, 1224, and 1225.

Journal of Polymer Science, vol. 51, pp. 387–398 (1961), article by G. Natta, I. Pasquon, A. Zambelli and G. Gatti.

Journal of Polymer Science, vol. 51, pp. 399–405 (1961), article by G. Natta, P. Corradini, and G. Allegra.

EDWARD STERN, Primary Examiner

U.S. Cl. X.R.

252—441; 260—93.7